May 7, 1968     W. E. NEWCOMER     3,381,349

CUTTING TOOL

Filed April 25, 1966

INVENTOR.
William E. Newcomer
BY Ralph Hammar
Attorney

3,381,349
CUTTING TOOL

William E. Newcomer, Latrobe, Pa., assignor to Newcomer Products, Inc., Latrobe, Pa., a corporation of Pennsylvania
Filed Apr. 25, 1966, Ser. No. 544,924
9 Claims. (Cl. 29—96)

This invention is a cutting tool having an indexable bit which will provide improved cutting action when used with negative rake tools.

Figure 1:
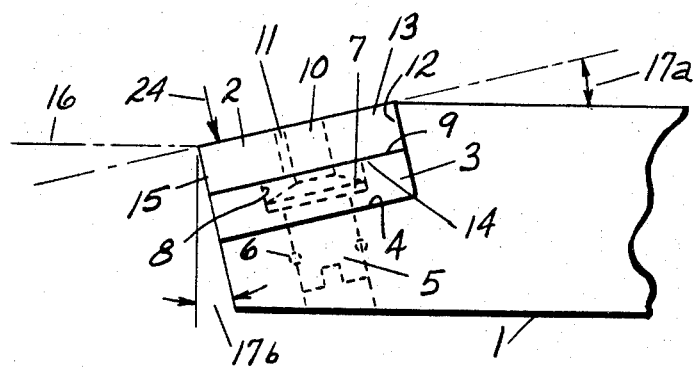
Figure 2:
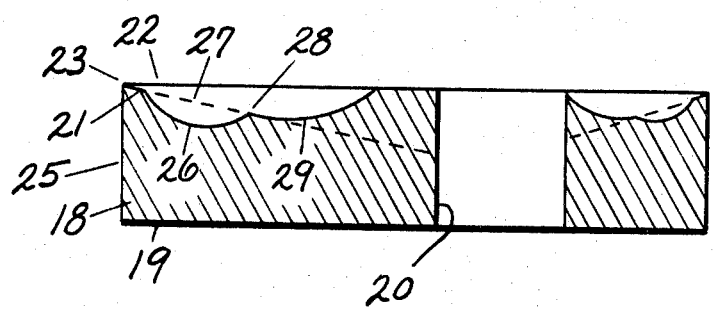
Figure 3:
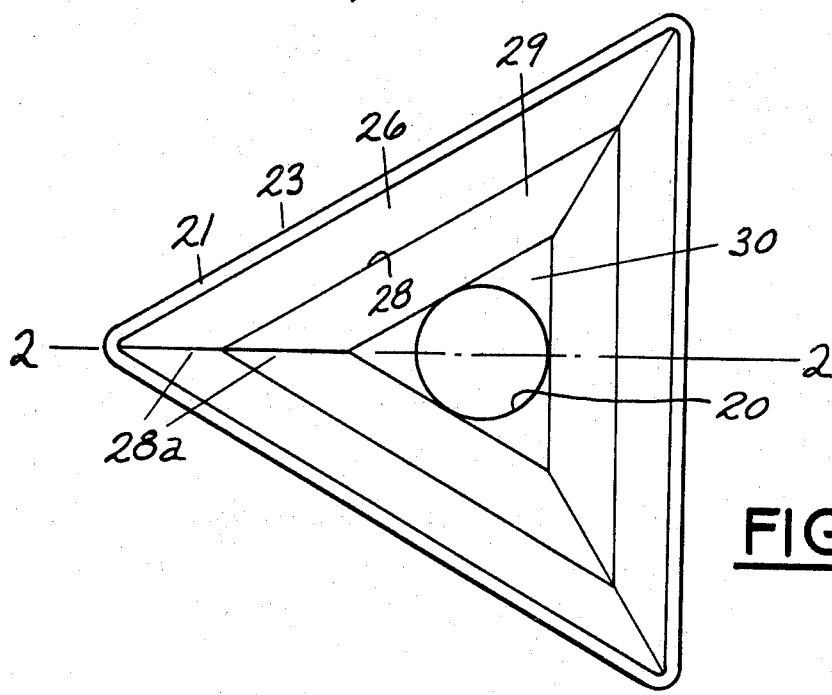

In the drawing, FIG. 1 is a side elevation of a negative rake tool, FIG. 2 is a section on line 2—2 of FIG. 3, and FIG. 3 is a top plan view of an improved bit for use with the negative rake tool.

FIG. 1 shows a negative rake tool of common construction having a body 1 on which is mounted an indevable bit 2. The indexable bit has a plurality of cutting edges symmetrically disposed about its axis which can be brought successively into cutting position by rotating or indexing the bit about its axis. In the particular tool shown there is a replaceable anvil 3 held on a seat 4 on the body by a pin 5 rotatably anchored in the body by a snap ring 6 and having a head 7 rotatably received in a recess 8 in the anvil to hold it in place. The upper surface 9 of the anvil provides a seat for the bit 2.

The bit is clamped by an upstanding eccentric 10 integral with the pin 5 which projects through a center hole 11 in the bit and clamps the bit edgewise against a shoulder 12 on the body. The bit 2 has a negative rake because its upper and lower surfaces 13 and 14 are parallel to each other and at right angles to its peripheral edge surface 15. To obtain the required cutting clearance, the bit seat 9 is inclined so that the upper surface 13 of the bit is tilted forward with respect to the center line 16 of the work. The negative rake angle 17a also results in a corresponding cutting clearance angle 17b between the body 2 and the work. When viewed endwise instead of sidewise as in FIG. 1, the bit seat 9 is similarly inclined to provide a similar negative rake angle. Although the inclination of the seat 9 is at a compound angle, it will be referred to hereafter as a negative rake angle.

The particular tool shown in FIG. 1 is merely one of many negative rake tools differing primarily in the manner of holding or clamping the indexable bits. While many negative rake tools have clamping means cooperating with center holes in the bits, there are other negative rake tools where the clamping means extends out over the top of the bit and clamps it down against the bit seat. The improved bit now to be described is usable with any negative rake tool, including those designed for bits with center holes as well as those designed for bits without center holes.

The bit shown in FIGS. 2 and 3 when mounted on the center hole clamped negative rake tool shown in FIG. 1, or on any other negative rake tool, reduces the horsepower required by approximately 20%. This is achieved by contouring the upper surface of the bit to promote free chip flow by a positive rake and associated chip control groove. The particular bit shown is triangular, one of the popular shapes, but could be any other indexable shape, such as round, square, etc. If the bit were square, the left side of FIG. 2 would be the same as the right side.

The bit 18 has a flat bottom surface 19 resting on the bit seat 9 and a center hole 20 for receiving the eccentric clamp 10. Adjacent the outermost edge of the top surface of the bit is a narrow land 21 inclined downward with respect to a plane through the outermost edges 23 of the bit at an angle greater than the negative rake angle of the bit seat 9 as indicated by dotted line 27. For example, if the negative rake angle of the seat were 5° measured in a direction normal to one of the cutting edges 23, the land 21 might have an inclination of 11° so that when mounted in the FIG. 1 tool, the land would have a net positive rake angle of 6°. The cutting thrust will still be primarily downward perpendicular to the bit seat 9 as indicated by the arrow 24 and since the peripheral edge surfaces 25 of the bit are at right angles to the bottom surface 19, there is an absence of overhung or unsupported bit structure which could weaken the bit as compared to the negative rake bit 2 shown in FIG. 1. The width of the land 21 is slight, usually only 15–30 thousandths of an inch and less than the expected feed per revolution. Radially inward of the land is a chip control groove 26 which is slightly depressed below the plane of the land indicated by dotted line 27. The radial width of the chip breaker groove is several times the width of the land and at the back terminates in a ridge 28 at or near the plane of the land. The chip breaking groove 26 promotes free cutting by offering a minimum of obstruction to chips leaving the land. The ridge 28 in cooperation with the associated surface of the chip breaking groove, breaks the chips into small fragments. Radially inward of the chip control groove 26 is a radiused section or groove 29 leading to a flat central island 30 surrounding the center hole 20 and having its upper surface in plane 22. The purpose of the island 30 is to provide a flat surface for negative rake tools of the type having top clamps. The radiused section 29 also provides a further chip control groove for any chips which are not broken by the groove 26. For the particular groove 26 illustrated, the radius of curvature is smallest adjacent the land 21 and greatest adjacent the ridge 28. The slope of the groove adjacent the land 21 is not critical. It should be great enough to clear the chips. The radius of curvature of the groove 29 is greater than any radius of curvature for the groove 26. The grooves 26 and 29 are of constant cross section except at the tips where the grooves join with a miter joint providing radial shoulders 28a. Since the bit is symmetrical, it can be used for left hand and right hand cuts.

The bit is adapted to manufacture from sintered carbide without any grinding. As sintered, the land 21 has a sharp cutting edge 23 and is sufficiently planar on its upper surface to provide the desired rake angle. Usually, the bottom surface 19 of the bit is sufficiently flat to provide the desired uniform support but if additional flatness were required, a simple surface grinding or lapping operation would suffice. The island 30, the chip grooves 26, 29, and ridge 28 require no finishing operations.

One of the advantages of the bit is its free cutting section. In typical tests on the same work piece, starting with a negative rake bit 2 with planar upper and lower surfaces and continuing with the substitution of the FIGS. 2 and 3 bit and with all other conditions the same, a reduction in power requirements of substantially 20% is obtained. Another advantage of the bit is that less pressure is applied to the work, resulting in better accuracy, cooler cutting, less chatter and better finish. The bit is usable in all negative rake cutters whether center hole clamped or top clamped and makes possible the advantages of positive rake cutting without the purchase of special tools to hold the positive rake bits.

What is claimed as new is:

1. An indexable bit having upper and lower peripheral edges lying in parallel planes and joined by peripheral edge surfaces perpendicular to said planes, the peripheral edges being symmetrically disposed about an axis perpendicular to said planes, and each upper peripheral edge being associated with a narrow land having a sharp junction with the associated peripheral edge to provide a cutting edge, said land extending radially inward and in a plane inclined downwardly from said junction, and a chip control groove radially inward of the land and having the section adjacent the land depressed below said downwardly inclined plane.

2. The bit of claim 1 in which the section of said chip control groove remote from the land terminates in a ridge substantially at said downwardly inclined plane.

3. The bit of claim 1 having in addition another chip control groove radially inward of the first chip control groove with a ridge between the grooves.

4. The bit of claim 2 having an island at the center with its upper surface substantially in the plane of the cutting edges and with a center hole so the bit may be interchangeably mounted on top clamped and center hole clamped negative rake cutting tools.

5. The bit of claim 4 having another chip breaker groove between said island and said first chip control groove with a ridge between the grooves.

6. In a negative rake tool having a seat inclined to provide a negative rake for an indexable bit having upper and lower surfaces lying in parallel planes and joined by peripheral edge surfaces perpendicular to said planes, the combination of an indexable bit having upper and lower peripheral edges lying in parallel planes and joined by peripheral edge surfaces perpendicular to said planes, the peripheral edges being symmetrically disposed about an axis perpendicular to said planes, and each upper peripheral edge being associated with a narrow land having a sharp junction with the associated peripheral edge to provide a cutting edge, said land extending radially inward and in a plane inclined downwardly from said junction, and a chip control goove radially inward of the land and having the section adjacent the land depressed below said downwardly inclined plane.

7. In combination with a negative rake indexable bit tool having a body, a bit seat and a bit clamping means, the bit of claim 1.

8. In combination with a negative rake indexable bit tool having a body, a bit seat and bit clamping means, the bit of claim 2.

9. In combination with a negative rake indexable bit tool having a body, a bit seat and bit clamping means, the bit of claim 5.

References Cited

UNITED STATES PATENTS

| | | | |
|---|---|---|---|
| 3,137,917 | 6/1964 | Dowd | 29—95 |
| 3,137,918 | 6/1964 | Brevning | 29—96 |
| 3,187,406 | 6/1965 | Franko | 29—95 |

HARRISON L. HINSON, *Primary Examiner.*